(12) United States Patent
Lettau et al.

(10) Patent No.: US 8,447,750 B2
(45) Date of Patent: May 21, 2013

(54) RATING SYSTEM AND SPATIAL SEARCHING THEREIN

(75) Inventors: Ty Lettau, Hercules, CA (US); Gever Tulley, Montara, CA (US); Robert S. Murata, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/561,268

(22) Filed: Jul. 30, 2012

(65) Prior Publication Data

US 2012/0290970 A1 Nov. 15, 2012

Related U.S. Application Data

(62) Division of application No. 12/070,932, filed on Feb. 22, 2008, now Pat. No. 8,244,705.

(51) Int. Cl.
  *G06F 17/30* (2006.01)
  *G06F 7/00* (2006.01)
(52) U.S. Cl.
  USPC ................ 707/706; 707/722; 707/758
(58) Field of Classification Search
  USPC ............. 707/706, 722, 758, 713, 736, 602, 707/705, 739; 382/305, 217, 293, 199
  See application file for complete search history.

(56) References Cited

U.S. PATENT DOCUMENTS

| | | | |
|---|---|---|---|
| 5,802,361 A * | 9/1998 | Wang et al. | 382/217 |
| 5,950,172 A | 9/1999 | Klingman | |
| 6,181,838 B1 * | 1/2001 | Knowlton | 382/305 |
| 6,763,148 B1 * | 7/2004 | Sternberg et al. | 382/293 |
| 6,772,142 B1 | 8/2004 | Kelling et al. | |
| 6,938,003 B2 | 8/2005 | Harpale | |
| 7,300,346 B2 | 11/2007 | Lydon et al. | |
| 7,363,319 B2 * | 4/2008 | Cappellini | 1/1 |
| 7,793,230 B2 | 9/2010 | Burns et al. | |
| 7,797,296 B2 * | 9/2010 | Cha et al. | 707/705 |
| 7,917,464 B2 * | 3/2011 | Frank et al. | 707/602 |
| 7,917,514 B2 * | 3/2011 | Lawler et al. | 707/739 |
| 8,244,705 B1 * | 8/2012 | Lettau et al. | 707/706 |
| 2003/0004995 A1 * | 1/2003 | Novaes | 707/513 |
| 2003/0103673 A1 | 6/2003 | Rathod et al. | |
| 2004/0024748 A1 * | 2/2004 | Brown et al. | 707/3 |
| 2006/0085395 A1 * | 4/2006 | Cradick et al. | 707/3 |
| 2006/0184608 A1 | 8/2006 | Williams et al. | |
| 2006/0200459 A1 * | 9/2006 | Ohnemus et al. | 707/5 |
| 2006/0286530 A1 | 12/2006 | Forrest et al. | |
| 2006/0287892 A1 | 12/2006 | Jones et al. | |
| 2006/0287984 A1 * | 12/2006 | Chen et al. | 707/3 |
| 2007/0005590 A1 * | 1/2007 | Thrasher | 707/5 |
| 2007/0204287 A1 | 8/2007 | Conradt | |
| 2008/0059452 A1 * | 3/2008 | Frank | 707/5 |
| 2008/0086464 A1 * | 4/2008 | Enga | 707/4 |
| 2008/0201302 A1 * | 8/2008 | Kimchi et al. | 707/3 |
| 2009/0089254 A1 | 4/2009 | Von Kaenel et al. | |
| 2009/0100019 A1 | 4/2009 | White et al. | |

* cited by examiner

*Primary Examiner* — Cheryl Lewis
(74) *Attorney, Agent, or Firm* — Wolfe-SBMC

(57) ABSTRACT

Techniques for a rating system are described, including presenting a visual field including two or more axes, each axis representing a criterion associated with an asset, receiving a user rating associated with the asset, the user rating including a point on the visual field, and updating a presentation of the visual field to include the user rating. Further, techniques for spatial searching within the rating system are described, including presenting a visual field including two or more axes, each axis representing a criterion, receiving a search inquiry including a shape input on the visual field, searching assets in response to the search inquiry, and displaying a subset of the assets determined from the searching.

8 Claims, 9 Drawing Sheets

RATING SYSTEM AND SPATIAL SEARCHING THEREIN

This application is a divisional of U.S. patent application Ser. No. 12/070,932, filed Feb. 22, 2008 now U.S. Pat. No. 8,244,705, which is hereby incorporated by reference in its entirety.

FIELD OF THE INVENTION

The present invention relates generally to software and rating systems. More specifically, techniques for a rating system and spatial searching therein are described.

BACKGROUND

Conventional rating systems often use a basic quantitative scoring system (e.g., four stars or five bars). Further, conventional rating systems are limited in how an individual can provide input. For example, in a conventional rating system based on four stars, a user is limited in the granularity of feedback available. In other words, a user can only provide a rating of zero stars, one star, two stars, three stars, or four stars, and nothing in between. This limits the value of a user's rating since the user must conform his or her rating to the restrictions of the conventional rating system. Further, a conventional rating system typically involves rating a single criterion for an item and a user cannot provide input on multiple criteria with a single rating.

Using conventional methods, searching within conventional rating systems typically includes selecting a particular rating. For example, using the conventional rating system based on four stars, a user can search for user ratings of three stars. The results from a conventional search have minimal use and a user likely must search multiple times to find desired information.

Thus, a solution for a rating system and spatial searching therein without the limitations of conventional techniques is needed.

BRIEF DESCRIPTION OF THE DRAWINGS

Various examples are disclosed in the following detailed description and the accompanying drawings.

DETAILED DESCRIPTION

Figure 1:
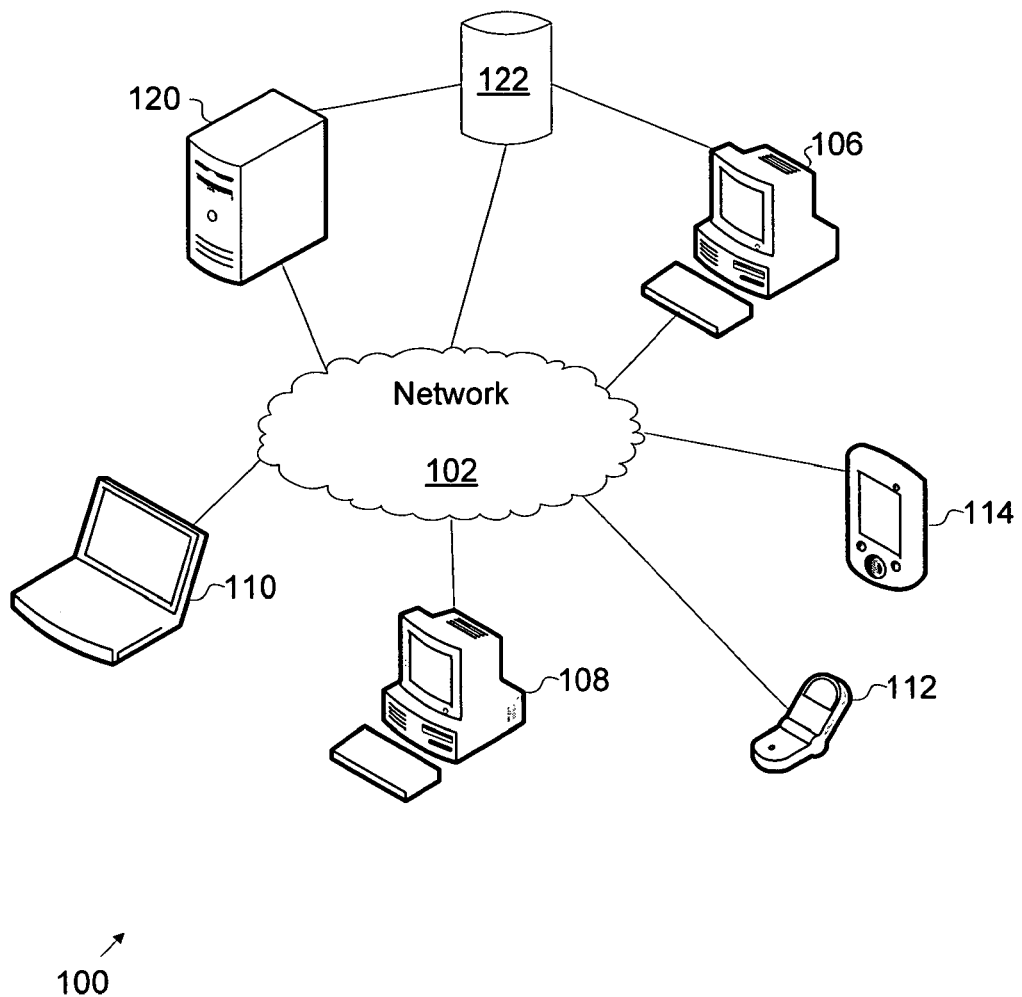
FIG. 1 illustrates an exemplary system for a rating system and spatial searching therein.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, AIR™, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Fireworks®, and InDesign® may also be used to implement the described techniques. The described techniques may be varied and are not limited to the examples or descriptions provided.

Techniques for a rating system and spatial searching therein are described. Computer programs, software, or applications used to create or modify text, visual, graphic, audio, video, or other types of content, presentations, and graphical user interfaces (GUIs) may be used to provide a rating system and spatial searching therein. A rating system may be used to rate assets. Assets may include any type of media, including, for example, videos, text, images, sound files, and documents. A rating system may include a visual field with two or more axes, each axis representing a criterion associated with an asset. For example, in a rating system for a political video, one axis may have "radical" on one end and "conservative" on the other end, and another axis may have "emotional" on one end and "logical" on the other end. Users may rate an asset by selecting a point on the visual field. For example, a user may think a particular political video is slightly "radical" and somewhat "emotional." That user may then select a point on the visual field corresponding to the desired rating. Instead of being constrained by discrete feedback options, a user may select any point on the visual field. Further, in a single rating (i.e., a point on the visual field), a user provides input on multiple criteria represented by the axes of the visual field, and this can be accomplished in one simple operation (e.g., a single click).

Further, a rating system presented in a visual field may be searched by a shape input on the visual field. For example, if a user wants to see a subset of videos that are rated as "radical" and "logical," the user may search the rating system by entering a search inquiry represented by a shape input on the visual field. In some examples, a shape input may be a square. In other examples, a shape input may be a line. In still other examples, a shape input may be a circle. In yet other examples, a shape input may be another geometric shape or an amorphous shape. In examples where the visual field includes two axes (e.g., the visual field is divided into four quadrants), a search inquiry may be a selection of one of the four quadrants of the visual field. In response to the search inquiry, the assets having ratings that fall within the shape input are displayed. For example, if a user inputs a small square in a visual field, the assets having ratings that fall with the small square are displayed.

FIG. 1 illustrates an exemplary system for a rating system and spatial searching therein. Here, system 100 includes network 102, clients 106-114, server 120, and database 122. System 100 may be used to implement the described techniques for a rating system and spatial searching therein. In some examples, network 102 may be implemented using the Internet, a local area network (LAN), wide area network (WAN), municipal area network (MAN), wireless local area network (WLAN), or any other type or topology of network apart from those described herein. Further, direct and indirect connections and couplings may be provided between clients 106-114 across network 102. The direct and indirect connections and couplings may be implemented using one or more networks. As an example, clients 106-114 may be implemented using a desktop or laptop computer, mobile computing device, personal digital assistant (PDA), smart phone, camera phone, or any other type of computing device. System 100 is not limited to any particular type of client and various types other than those described above may be used. Further, network connections or couplings between the above-described elements in system 100 may be varied and are also not limited to the examples provided.

In other examples, server 120 may be implemented and used to deliver (i.e., serve) content, information, or data requested by one or more of clients 106-114. For example, content requested by client 106 may be performed using a web browsing application (not shown) installed on client 106. Content may include text, documents, files, images, photos, applications, or any type of information or data. When requested from server 120, content may be delivered to the requesting client (i.e., clients 106-114). In other examples, server 120 may be a server configured for a given purpose (e.g., ad server, web server, content server, application server, web services, gateway, and others). In yet other examples, server 120 may be a server network configured for a given purpose (e.g., ad server, web server, content server, application server, web services, gateway, and others).

Techniques for a rating system and spatial searching therein such as those described herein may be implemented using the above-described system and topology. In some examples, techniques for a rating system and spatial searching therein may be performed locally on one or more of clients 106-114. In other examples, techniques for a rating system and spatial searching therein may be performed remotely or in a distributed manner using server 120, one or more of clients 106-114, and network 102. Further, other system configurations, topologies, clients, end devices, intermediate devices, and implementation techniques may be used and are not limited to those described above.

Figure 2:
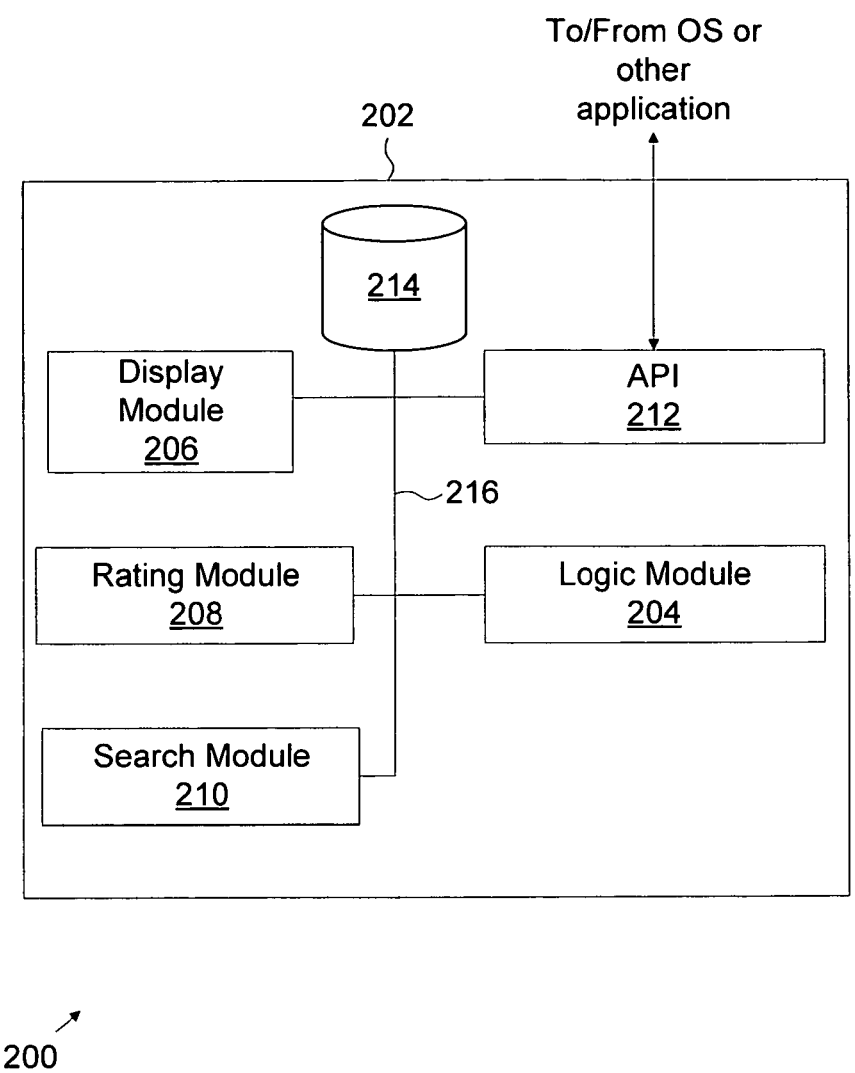
FIG. 2 illustrates an exemplary application for a rating system and spatial searching therein.

FIG. 2 illustrates an exemplary application for a rating system and spatial searching therein. Here, system 200 includes application 202, logic module 204, display module 206, rating module 208, search module 210, application programming interface (API) 212, storage 214, and data bus 216. Logic module 204, display module 206, rating module 208, search module 210, API 212, and storage 214 may be configured to transfer data between each of the above-described elements using data bus 216. In some examples, storage 214 may be a local storage repository or memory implemented on a device running application 202. In other examples, storage 214 may be implemented as part of application 202 (as shown) or as a separate element included on the same device as application 202. In yet other examples, storage 214 may be a remote repository, which may be networked directly or indirectly to application 202. Data associated with a rating system may be stored in either storage 214 or a remote repository (not shown), and data may be organized into files. Files may include data associated with documents, images, text, applications, video, audio, applications, program or software code, photos, or any other type of data that may be grouped together as a stream of bits (e.g., "1," "0," or any other data representation using binary, tertiary, or any other type of number system using a different mathematical base) that may be opened, accessed, launched, executed, run, downloaded, copied, removed, or otherwise operated upon as a single unit or instantiation. Further, files may include content such as text, images, spreadsheets, digital videos, digital audios, advertisements, web sites and pages, documents, articles, web services-delivered content and applications, or other content formatted in various types of formats using different applications. In some examples, files, when retrieved from storage 214 may be opened and launched based on the type of file retrieved. For example, a video file may be downloaded, retrieved, streamed, or otherwise accessed from storage 214. As another example, a web site having video and audio data may be streamed as a data stream from storage 214. Further, application 202 may be implemented as part of another application or as a separate application in data communication with other applications (e.g., operating systems, applications, and others) using API 212.

Display module 206 may be configured to present a visual field with two or more axes. In some examples, each axis of the visual field represents a criterion associated with the asset. In other examples, display module 206 may present a visual field showing one or more user ratings associated with the asset, and a particular user rating may be shown in a distinguishing manner. In still other examples, display module 206 may present a visual field showing a median rating. Further, display module 206 may modify the presentation of the visual field when at least one of the axes is modified to represent a different criterion.

Rating module 208 may be configured to receive a user rating associated with an asset. Further, rating module 208 may be configured to generate a median rating associated with the asset. In some examples, a median rating is an average of user ratings for the asset. In other examples, a median rating is determined by one or more algorithms. For example, an algorithm may weigh one user's input differently, depending on various factors, including, but not limited to, the user's standing in the community and the total number of ratings from the user.

Search module 210 may be configured to receive a search inquiry. A search inquiry may include a shape input on the visual field presented by display module 206. In some examples, a shape input may be a square. In other examples, a shape input may be a line. In still other examples, a shape input may be a circle. In yet other examples, a shape input may be another geometric shape or an amorphous shape. In examples where the visual field includes two axes (e.g., the visual field is divided into four quadrants), a search inquiry may be a selection of one of the four quadrants of the visual field. In response to the search inquiry, search module 210 searches assets. Display module 206 may be configured to display a subset of the assets having ratings that fall within the shape input.

A transaction flow initiated by an interaction to provide a user rating may be communicated using API 212 from another application or operating system (OS). In some examples, an interaction to provide a user rating includes selection of a point on the visual field presented by display module 206. Logic module 204 may be implemented to provide logic, control, coordination, command, signaling, and other functions and features for application 202. For example, logic module 204 may be configured to coordinate between rating module 208 and display module 206 when a median rating has been generated and the visual field is changed accordingly. In other examples, system 200 and the described elements may be varied in implementation, function, or structure and are not limited to the examples provided.

Figure 3A:
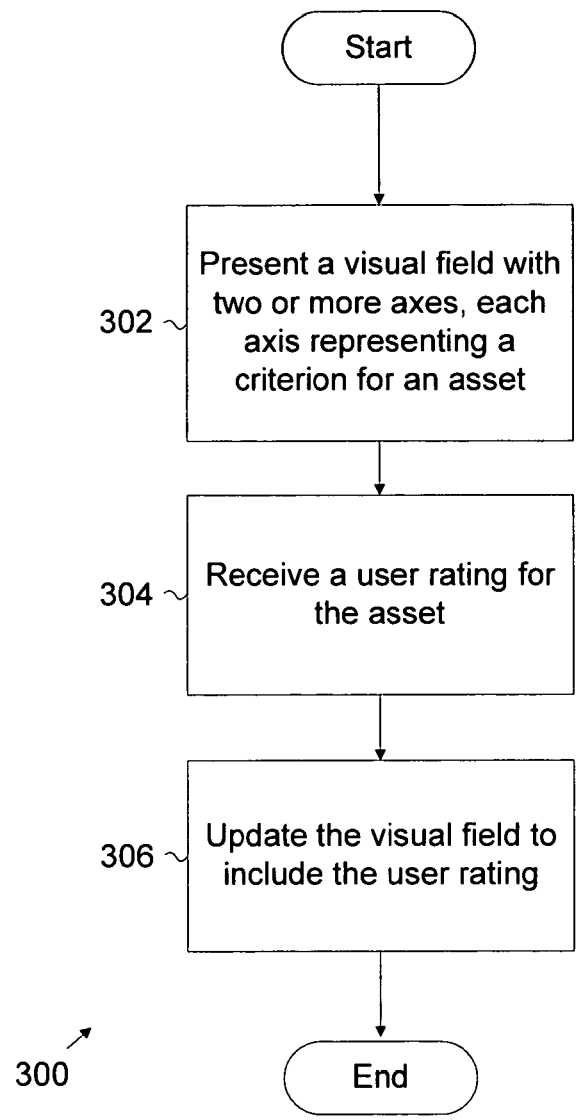
FIG. 3A illustrates an exemplary process for a rating system.

FIG. 3A illustrates an exemplary process for a rating system. Here, process 300 starts by presenting a visual field with two or more axes, each axis representing a criterion for an asset (302). In some examples, each axis may be variable. For example, if a visual field has a first axis representing criterion A and a second axis representing criterion B, the first axis may be modified to represent criterion C, the second axis may be modified to represent criterion D, or both the first axis and the second axis may be modified to represent different criterion. When an axis is modified, presentation of the visual field is updated to show the visual field with the newly-modified axes. Process 300 continues by receiving a user rating for the asset (304). In some examples, the user rating may include a point on the visual field. Process 300 continues by updating the visual field to include the user rating (306). In some examples, the updated visual field may present user ratings as dots on the visual field. In other examples, the updated visual field may present a particular user rating in a distinguishing manner. For example, if a user rates an asset, that user's rating may be represented by an "X" while other users' ratings of the asset may be represented by dots on the visual field. In other examples, the above-described process may be varied and is not limited to the processes or sub-processes described above.

Figure 3B:
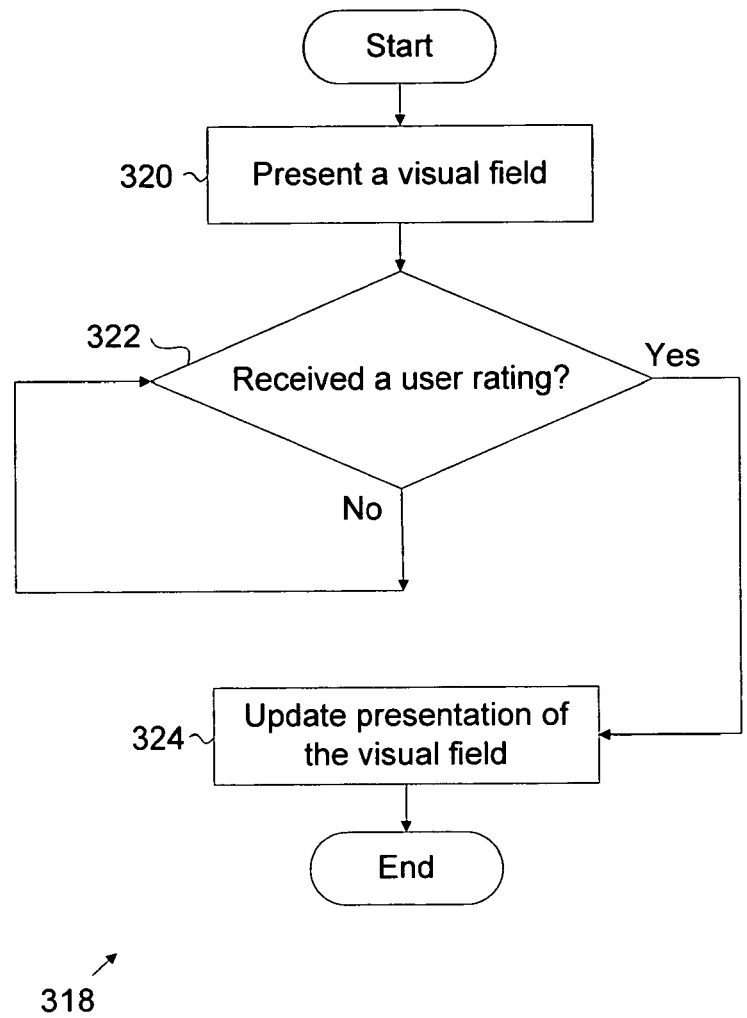
FIG. 3B illustrates an exemplary sub-process for a rating system.

FIG. 3B illustrates an exemplary sub-process for a rating system. In some examples, sub-process 318 further describes updating a presentation of a visual field. Here, a visual field is presented as a rating system for an asset (320). A determination is made as to whether a user rating has been received (322). In some examples, the user rating may include a point on the visual field. If a user rating has not been received, a determination is made again as to whether a user rating has been received. If a user rating has been received, sub-process 318 concludes by updating the presentation of the visual field (324). For example, if a visual field is presented as a rating system for an asset and a user rating is received, presentation of the visual field may be updated to include a dot representing the user rating that was received. In other examples, when a user rating is received, presentation of the visual field may be updated to present the user rating in a distinguishing manner, as described above in conjunction with FIG. 3A. In yet other examples, the above-described process may be varied and is not limited to the processes or sub-processes described above.

Figure 3C:
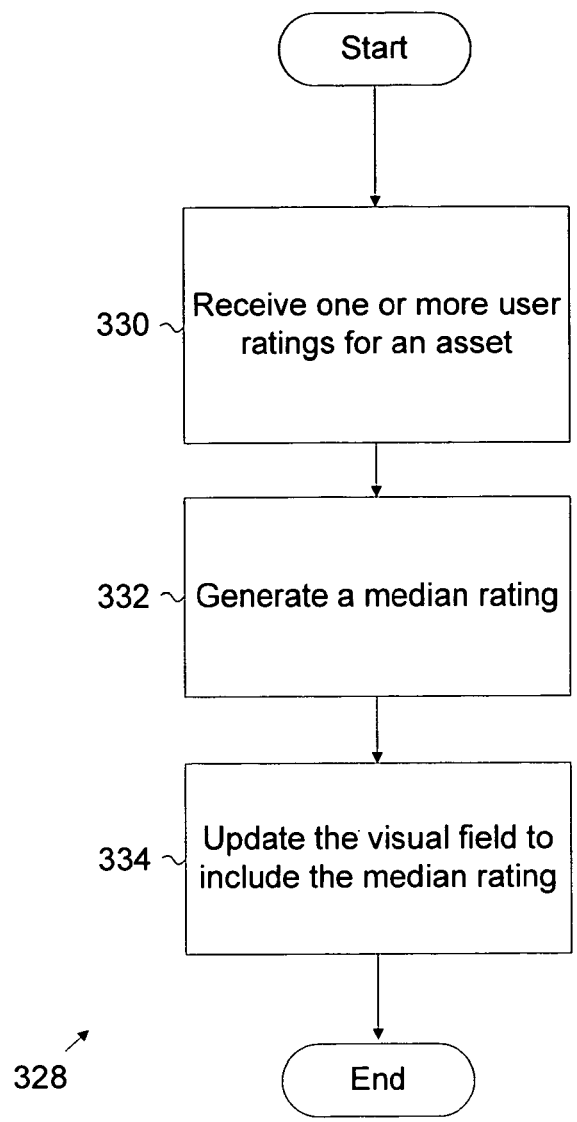
FIG. 3C illustrates an alternative exemplary sub-process for a rating system.

FIG. 3C illustrates an alternative exemplary sub-process for a rating system. In some examples, sub-process 328 further describes updating a presentation of a visual field. Here, process 328 starts by receiving one or more user ratings for an asset (330). In some examples, user ratings may include points on the visual field. When one or more user ratings are received, a median rating associated with the asset is generated (332). In some examples, a median rating is an average of user ratings for the asset. For example, if there is only one user rating, the average of the user ratings is equal to the one user rating. As another example, if there are two or more user ratings, the average of the user ratings is the average of the two or more user ratings. In other examples, a median rating is determined by one or more algorithms. For example, an algorithm may weigh one user's input differently, depending on various factors, including, but not limited to, the user's standing in the community and the total number of ratings from the user. After a median rating is generated, the visual field is updated to include the median rating (334). In some examples, the updated visual field may present the median rating in a distinguishing manner. For example, if user ratings are represented by dots on the visual field, the median rating may be represented by a small box with a "+" symbol within it. In other examples, the above-described process may be varied and is not limited to the processes or sub-processes described above.

Figure 4:
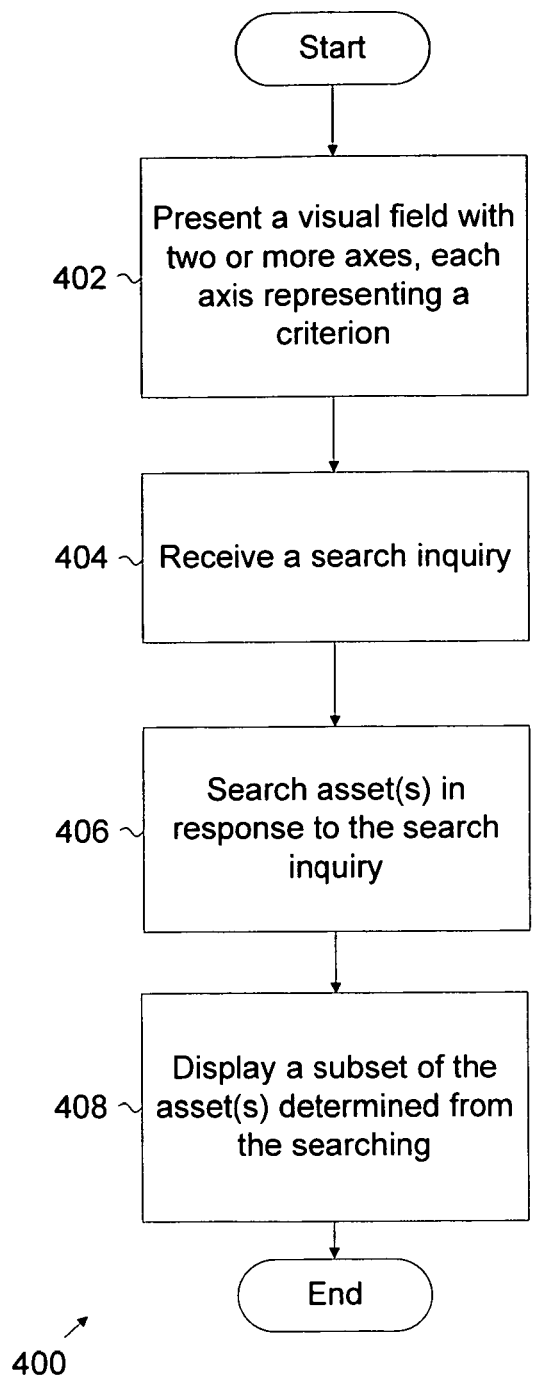
FIG. 4 illustrates an exemplary process for a rating system and spatial searching therein.

FIG. 4 illustrates an exemplary process for a rating system and spatial searching therein. Here, process 400 starts by presenting a visual field with two or more axes, each axis representing a criterion (402). In some examples, each axis may be variable, as described in conjunction with FIG. 3A above. Process 400 continues by receiving a search inquiry (404). In some examples, the search inquiry may be represented by a shape input on the visual field. For example, a shape input may be a square. As another example, a shape input may be a line. As still another example, a shape input may be a circle. In other examples, a shape input may be another geometric shape or an amorphous shape. In examples where the visual field includes two axes (e.g., the visual field is divided into four quadrants), a search inquiry may be a selection of one of the four quadrants of the visual field. In response to the search inquiry, assets are searched (406). Process 400 concludes by displaying a subset of the assets determined from the searching (408). In some examples, the displayed subset of assets has median ratings that fall within the search inquiry. In other examples, the displayed subset of assets is the subset of assets in which all of the individual ratings for the asset fall within the search inquiry. For example, if the search inquiry was a shape input of a square on the visual field, in some examples, assets having median ratings that fall within the square are displayed, and in other examples, assets having all of its individual ratings inside the square are displayed. In other examples, the above-described process may be varied and is not limited to the processes or sub-processes described above.

Figure 5:
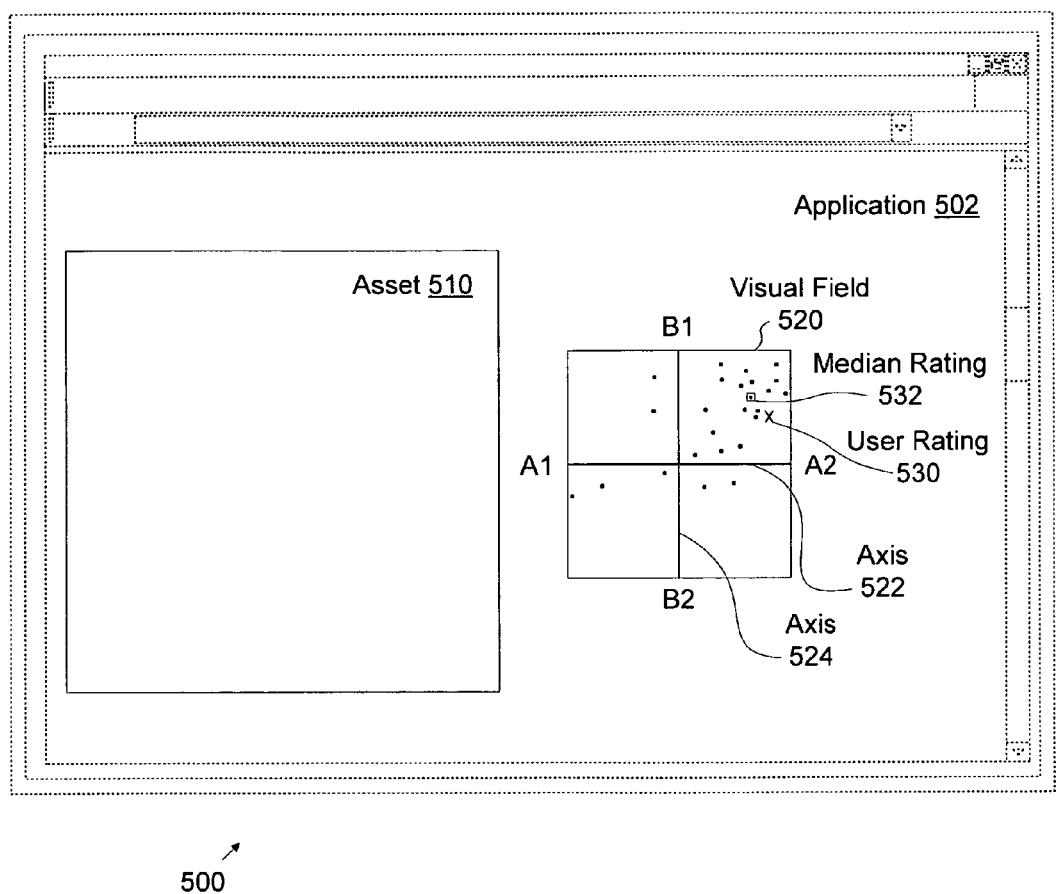
FIG. 5 illustrates an exemplary implementation of a rating system.

FIG. 5 illustrates an exemplary implementation of a rating system. Here, system 500 includes application 502, asset 510, visual field 520, axes 522-524, user rating 530, and median rating 532. Although in FIG. 5, two axes are shown in visual field 520, in other examples, there may be more axes. For example, visual field 520 may include three axes where a user input is a point placed in three-dimensional space. Although system 500 shows one example of an application with visual field 520, visual field 520 may be implemented differently using other types of applications and the examples described are not limited to any particular software environment as application 202 (FIG. 2) may be implemented using various types of software.

Here, visual field 520 is presented with axes 522-524, with axis 522 representing one criterion associated with asset 510 and axis 524 representing another criterion associated with asset 510. In FIG. 5, axis 522 represents criterion A, with one end of axis 522 representing one extreme of criterion A (e.g., A1) and another end of axis 522 representing another extreme of criterion A (e.g., A2). Similarly, axis 524 represents criterion B, with one end of axis 524 representing one extreme of criterion B (e.g., B1) and another end of axis 524 representing another extreme of criterion B (e.g., B2). As an example, axis 522 may represent the criterion of political viewpoint, where A1 may be "radical" and A2 may be "conservative." As another example, axis 524 may represent the criterion of emotion, where B1 may be "emotional" and B2 may be "logical." In some examples, axes 522-524 may be variable. For example, if axis 522 represents criterion A and axis 524 represents criterion B, multiple variations are possible. In one example, axis 522 may be modified to represent criterion C while axis 524 remains unmodified, and presentation of the visual field is updated to show the visual field with axis 522 representing criterion C and axis 524 representing criterion B. In another example, axis 524 may be modified to represent criterion D while axis 522 remains unmodified, and presentation of the visual field is updated to show the visual field with axis 522 representing criterion A and axis 524 representing criterion D. In yet another example, axis 522 may be modified to represent criterion E while axis 524 may be modified to represent criterion F, and presentation of the visual field is updated to show the visual field with axis 522 representing criterion E and axis 524 representing criterion F.

Visual field 520 may be configured to receive a user rating associated with asset 510. In some examples, a user rating may be a point on the visual field. As shown in FIG. 5, visual field 520 may display multiple user ratings received for asset 510 as multiple dots on the visual field. When a user rating is inputted on the visual field, presentation of the visual field is updated to include the user rating. After a user rates asset 510, that user's rating may be presented in a distinguishing manner. For example, that user's rating may be represented by an "X" like user rating 530, while other users' ratings of asset 510 may be represented by dots on the visual field. Although in FIG. 5, user rating 530 is represented by an "X", in other examples, user rating 530 may be represented by other distinguishing symbols.

After one or more user ratings for asset 510 have been received, a median rating may be generated. In some examples, a median rating is an average of user ratings for the asset. For example, if there is only one user rating, the average of the user ratings is equal to the one user rating. In the example of FIG. 5, since multiple user ratings have been received, the average of the user ratings is an average of the user ratings received. In other examples, a median rating is determined by one or more algorithms. For example, an algorithm may weigh one user's input differently, depending on various factors, including, but not limited to, the user's standing in the community and the total number of ratings from the user. As more user ratings are received, the location of median rating 532 on visual field 520 may change. As a new user rating associated with asset 510 is received, a median rating is generated and presentation of visual field 520 is updated to include the new position of median rating 532. In some examples, median rating 532 may be presented in a distinguishing manner. For example, median rating 532 may be represented by a small box with a "+" symbol within it. In other examples, median rating 532 may be represented by other distinguishing symbols. In yet other examples, system 500 and the above-described elements may be varied and are not limited to the functions, structures, configurations, or implementations provided.

Figure 6:
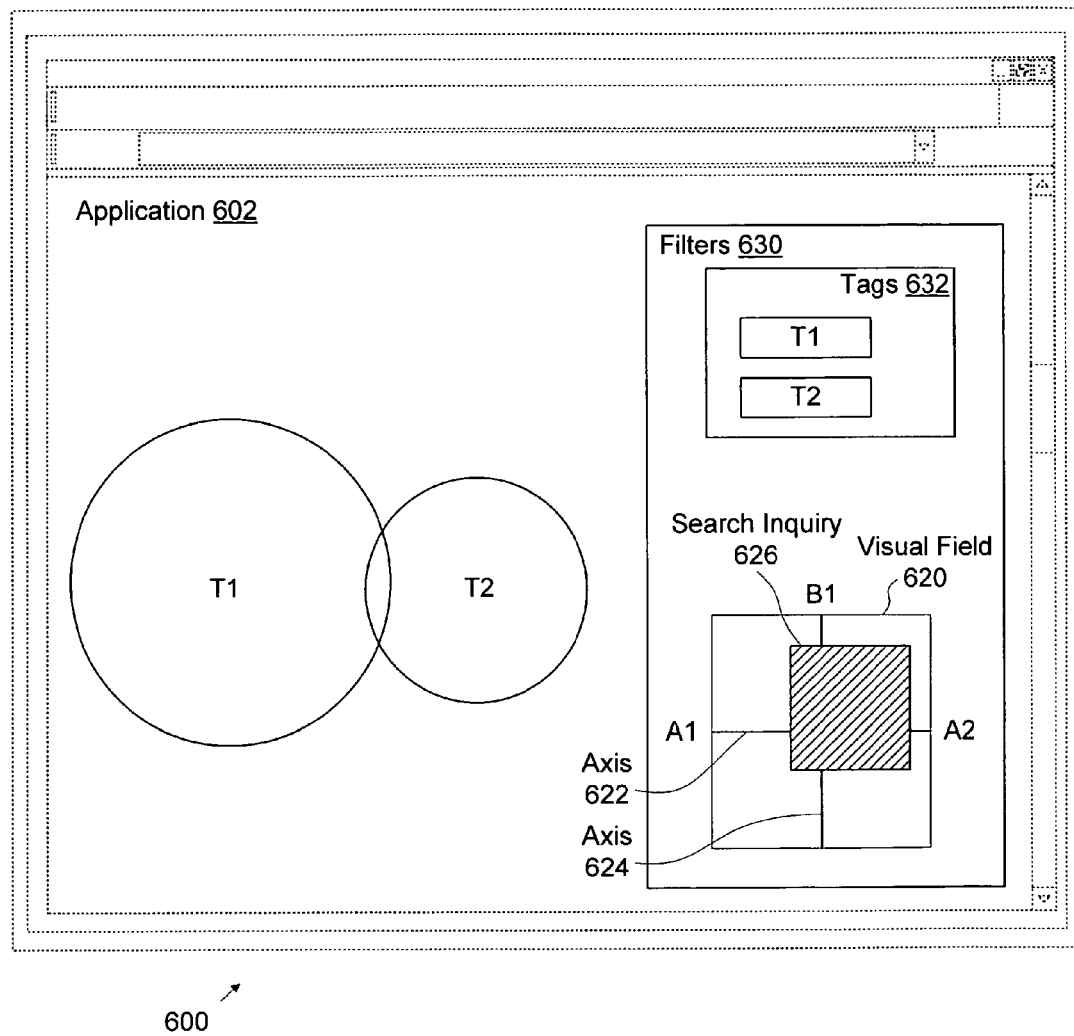
FIG. 6 illustrates an exemplary implementation of a rating system and spatial searching therein.

FIG. 6 illustrates an exemplary implementation of a rating system and spatial searching therein. Here, system 600 includes application 602, visual field 620, axes 622-624, search inquiry 626, filters 630, and tags 632. Although in FIG. 6, two tags (e.g., T1 and T2) are shown in tags 632, in other examples, the number of tags may be varied. Although system 600 shows one example of using visual field 620 as a search filter, spatial searching within a rating system may be implemented differently using other types of applications and the examples described are not limited to any particular software environment as application 202 (FIG. 2) may be implemented using various types of software.

Here, visual field 620 is presented with axes 622-624, with axis 622 representing one criterion associated with asset 610 and axis 624 representing another criterion associated with asset 610. In FIG. 6, axis 622 represents criterion A, with one end of axis 622 representing one extreme of criterion A (e.g., A1) and another end of axis 622 representing another extreme of criterion A (e.g., A2). Similarly, axis 624 represents criterion B, with one end of axis 624 representing one extreme of criterion B (e.g., B1) and another end of axis 624 representing another extreme of criterion B (e.g., B2). As an example, axis 622 may represent the criterion of political viewpoint, where A1 may be "radical" and A2 may be "conservative." As another example, axis 624 may represent the criterion of emotion, where B1 may be "emotional" and B2 may be "logical." In some examples, axis 622 and axis 624 may be variable, as described above in conjunction with axes 522-524 in FIG. 5.

Visual field 620 may be configured to receive search inquiry 626. In some examples, a search inquiry may be a shape input on the visual field. As shown in FIG. 6, in some examples, a shape input may be a square. In other examples, a shape input includes other shapes, including a line, a circle, other geometric shapes, or amorphous shapes. In yet other examples, where visual field 620 includes two axes (e.g., the visual field is divided into four quadrants), search inquiry 626 may be a selection of one of the four quadrants of visual field 620. In response to search inquiry 626, assets are searched and a subset of the assets determined from the search is displayed. Thus, assets that fall within search inquiry 626 are displayed. In some examples, the displayed subset of assets has median ratings that fall within the search inquiry. In other examples, the displayed subset of assets is the subset of assets in which all of the individual ratings for the asset fall within the search inquiry. For example, if the search inquiry was a shape input of a square on the visual field, in some examples, assets having median ratings that fall within the square are displayed, and in other examples, assets having all of its individual ratings inside the square are displayed. For example, using the criterion examples from above, where A1 represents "radical," A2 represents "conservative," B1 represents "emotional," and B2 represents "logical," since search inquiry 626 is placed closer to the upper right corner of visual field 620, the assets determined from the search and displayed are assets that were rated as more emotional than logical and more conservative than radical. In other examples, search inquiry 626 may be a selection of one of the four quadrants of visual field 620. For example, if search inquiry 626 was a selection of the upper right quadrant of visual field 620, the assets determined from the search and displayed would be assets that were rated as emotional and conservative. Further, tags 632 may be used to enhance display of the search results. Assets determined from the search that are tagged with "T1" are displayed in the "T1" portion of the search results and assets determined from the search that are tagged with "T2" are displayed in the "T2" portion of the search results. Although in FIG. 6, the search results are presented in a Venn diagram, in other examples, the presentation of search results may be varied. In yet other examples, system 600 and the above-described elements may be varied and are not limited to the functions, structures, configurations, or implementations provided.

Figure 7:
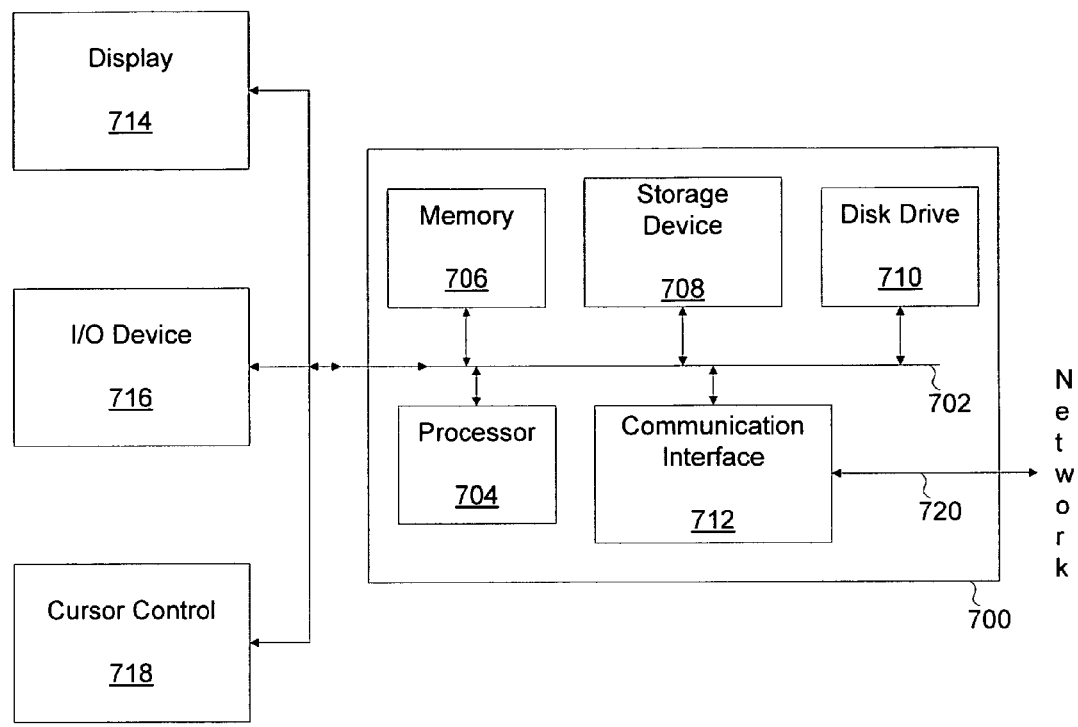
FIG. 7 illustrates an exemplary computer system suitable for a rating system and spatial searching therein.

FIG. 7 illustrates an exemplary computer system suitable for a rating system and spatial searching therein. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any tangible medium that participates in providing instructions to processor 704 for execution. Such a medium may take many forms, including but not limited to, non-volatile media and volatile media. Non-volatile media includes, for example, optical or magnetic disks, such as disk drive 710. Volatile media includes dynamic memory, such as system memory 706.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 702 for transmitting a computer data signal.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
    presenting a visual field comprising a plurality of axes, each axis representing a criterion associated with an asset;
    receiving a user rating associated with the asset, the user rating comprising a point on the visual field; and
    updating a presentation of the visual field to comprise the user rating.

2. The method of claim 1, further comprising:
    generating a median rating associated with the asset; and
    updating the presentation of the visual field to comprise the median rating.

3. The method of claim 1, wherein each of the plurality of axes is variable.

4. The method of claim 1, further comprising modifying the presentation of the visual field by modifying at least one of the plurality of axes to represent another criterion.

5. A system, comprising:
    a memory configured to store data associated with a plurality of assets; and
    a processor configured to present a visual field comprising a plurality of axes, each axis representing a criterion associated with one of the plurality of assets, to receive a user rating associated with the one of the plurality of assets, the user rating comprising a point on the visual field, and to update a presentation of the visual field to comprise the user rating.

6. The system of claim 5, wherein the processor is further configured to generate a median rating for one of the plurality of assets, and to update the presentation of the visual field to comprise the median rating.

7. The system of claim 5, wherein the processor is further configured to modify the presentation of the visual field by modifying at least one of the plurality of axes to represent another criterion.

8. A computer program product embodied in a computer readable storage medium and comprising computer instructions for:
    presenting a visual field comprising a plurality of axes, each axis representing a criterion associated with an asset;
    receiving a user rating associated with the asset, the user rating comprising a point on the visual field; and
    updating a presentation of the visual field to comprise the user rating.

* * * * *